United States Patent Office 2,932,571
Patented Apr. 12, 1960

2,932,571

FLAVORED SWEETENER FOR LIVESTOCK FEED PRODUCTS

Talmadge B. Tribble, Glenview, Ill.

No Drawing. Application January 17, 1958
Serial No. 709,464

8 Claims. (Cl. 99—2)

This invention relates in general to a composition for incorporation in feed products to improve the palatability thereof and has more particular reference to such a composition which comprises a flavoring and a sweetener combined therewith and which therefore may be aptly called a flavored sweetener.

It is a well known and common practice to sweeten commercial feeds with from about 200 pounds to about 300 pounds of cane sugar or from about 20 pounds to about 200 pounds of molasses syrup per ton of the feed to improve its palatability and thus to induce the animals and other livestock to eat more feed. Cane sugar in such proportions not only is expensive and bulky, but also, due to the heavy sweetness of the treated feed, causes appetite fatigue with a consequent reduction in the feed consumed and, in hot weather, a retardation of the desired gain in weight probably due to the heat-producing energy of the sugar. Molasses syrup in such proportions likewise presents a bulk problem and is relatively expensive. In addition, such proportions of molasses syrup often result in a diarrhea and other undesirable systemic reactions in poultry and other livestock. Cane sugar as a feed sweetener is therefore usually limited in use to the specialty type feeds such as the so-called sweet-tooth baby pig feed starters. Even such feeds sweetened with molasses syrup, if fed to the livestock for a sufficient period of time to produce the desired results, are objectionable as inducing the undesired systemic reactions mentioned above.

As appetite fatigue or undesired systemic reactions are observed, a less palatable feed, or an unsweetened feed flavored with from 1 pound to 20 pounds of anise powder or an equivalent proportion of another livestock feed flavoring per ton of the feed, is substituted for the offending sweetened feed. The livestock feed flavorings, which have been so employed in the prior art, include, besides anise, chocolate, vanilla, honey, carob, coconut, rum, butter, maple, orange, specific commercial flavorings, or combinations of one or more of the foregoing and other flavorings and flavoring compounds acceptable to and for livestock. Where the less palatable feed is used alone, the result is a reduction in consumption with a consequent retardation of the desired gain in weight by the livestock. Due to the expense involved and the fact that the livestock rejects over-flavored feeds, livestock feed flavoring has been limited or restricted in use, but even where used in unsweetened and therefore less palatable feeds, the result is a retardation of the desired gain in weight of the livestock due to the lack of nutriment occasioned by the omission of the cane sugar or molasses syrup.

An object of the present invention is the provision of a novel and an improved composition which is adapted to be incorporated in feeds to improve the palatability thereof and which overcomes the above-mentioned objections.

Another object of the invention is the provision of a flavored sweetener wherein a livestock feed flavoring and saccharin sodium or other non-carbohydrate concentrated sweetener are so combined alone or in a suitable carrier that the resulting composition, while including less of the concentrated sweetener than the equivalent proportion of cane sugar hitherto used alone to produce the desired sweetness and less of the livestock feed flavoring than the proportion thereof heretofore used alone to produce the desired flavor intensity, is adapted when mixed with the feed to produce a flavored, sweetened product that is relished by livestock with daily regularity without causing the above-mentioned systemic reactions.

A further object of the invention is the provision of a flavored sweetener including a livestock feed flavoring and saccharin wherein the characteristic bitter aftertaste of the saccharin is eliminated and less of each of the saccharin and flavoring is needed for treating the feeds than would be required if they are used separately.

Other objects and advantages of the invention will appear as it is better understood from the following description which discloses a preferred embodiment of the invention.

In attempts to overcome the disadvantages of cane sugar, the use of saccharin, which is about 500 times as sweet as cane sugar, saccharin sodium, saccharin calcium, and other non-carbohydrate concentrated sweeteners have been proposed as livestock feed sweeteners. Other concentrated sweeteners proposed for such use include the calcium and sodium salts of cyclohexysulfamate known as "Sucaryl" which is about 30 times as sweet as cane sugar. Due, however, to a characteristic bitter aftertaste, such concentrated sweeteners have been found to be unacceptable to livestock.

I have discovered that a synergistic action occurs between the livestock feed flavorings and the concentrated sweeteners when they are combined as will presently be described hereinafter, which results in an intensification of the flavor and sweetness of such a flavoring and sweetener in the composition and the masking, if not indeed the elimination, of the objectionable characteristic taste of the concentrated sweetener.

That discovery is utilized in the present invention to produce a flavored sweetener by incorporating the concentrated sweetener in the livestock feed flavoring in liquid form to provide a solution and heating the solution, preferably in a vacuum, and converting it into a dry powder wherein the sweetener and the flavoring are present in the following percentages by weight: concentrated sweetener from about 1% to about 99.95% and flavoring from about 99% to about 0.05%.

That powdered flavored sweetener may be employed alone as an additive for improving the palatability of livestock feeds, or it may be intermixed with corn sugar or other finely divided carrier in the proportion by weight of from about 78% to about 98.9% of the carrier and from about 22% to about 1.1% of the flavored sweetener. I have also found that, instead of the additive being in powder form as when the flavored sweetener is employed alone or mixed with a finely divided dextrose carrier, it may be prepared as a liquid emulsion. Thus the flavored sweetener, water, and acacia or other vegetable gum as the emulsifying agent are employed to prepare a liquid emulsion that has proved to be very satisfactory as an additive for improving the palatability of livestock feeds. Like the other carbohydrate flavorings hereinabove referred to, molasses, wet or dry, may be employed to flavor saccharin and the resulting flavored sweetener is useful alone or in one of the mentioned carriers as an additive for livestock feeds.

Illustrative of the novel additive of the present invention, I am setting out below several formulas exemplifying embodiments of the invention as presently preferred by me:

*Formula No. 1 (dry powder)*

| | Percent by weight |
|---|---|
| Anise oil | 0.1 |
| Saccharin sodium | 1.0 |
| Corn sugar | 98.9 |

*Formula No. 2 (dry powder)*

| | |
|---|---|
| Anise oil | 1.0 |
| Saccharin sodium | 10.0 |
| Corn sugar | 89.0 |

*Formula No. 3 (dry powder)*

| | |
|---|---|
| Anise oil | 10 |
| Saccharin sodium | 90 |

*Formula No. 4 (liquid emulsion)*

| | |
|---|---|
| Anise oil | 2.0 |
| Saccharin sodium | 20.0 |
| Vegetable gum | 1.0 |
| Water | 77.0 |

*Formula No. 5*

| | |
|---|---|
| Saccharin sodium | 1 |
| Molasses (dry or liquid) | 99 |

*Formula No. 6 (dry powder)*

| | |
|---|---|
| Anise oil | 0.05 |
| "Sucaryl" sodium | 50.00 |
| Corn sugar | 49.95 |

*Formula No. 7 (dry powder)*

| | |
|---|---|
| Anise oil | 0.1 |
| "Sucaryl" sodium | 99.9 |

As a replacement for cane sugar in livestock feeds, 10 pounds of Formula No. 1, 1 pound of Formula No. 2, 0.1 pound of Formula No. 3, 0.5 pound of Formula No. 4, 10 pounds of Formula No. 5, 3.3 pounds of Formula No. 6, and 1.7 pounds of Formula No. 7, respectively, have proved to be about the equivalent of 100 pounds of cane sugar. I have also found that about 30 pounds of Formula No. 1, about 3 pounds of Formula No. 2, about 0.3 pound of Formula No. 3, or about 1.5 pounds of Formula No. 4 will replace about 300 pounds of cane sugar as a sweetener for 1 ton of pig starter feeds. As already pointed out, from about 1 pound to about 20 pounds of anise powder have hitherto been required to flavor livestock feeds. Thus according to the present invention, only about ½ as much saccharin sodium and only about 1/10 as much anise oil are needed in the novel flavored sweetener than would be required if they were used separately.

The particular percentages of ingredients set forth in the foregoing formulas thus make a correctly synergized composition of the sweetener and flavoring. Adjustments in such percentages in each of those formulas are determined at least in part by the strength or concentration of the flavoring employed and are made to produce a sweet flavor blend whereby neither the sweetener nor the flavoring will dominate. Such a result is arrived at by comparative taste tests between the flavored sweetener and a control solution comprising 100 pounds of cane sugar to 2000 pounds of water, to compare the relative sweetness of the flavored sweeteners of the invention. As an example of one such test, the taste of a dilution of 1 pound of Formula No. 2 to 2000 pounds of water is compared with that of the control solution.

To test the taste appeal of the novel composition, baby pigs were chosen as test animals, because they are considered to be among the most difficult livestock to wean over to commercial starter feeds. Feed sweetened with cane sugar according to the prior art and feed treated with my novel flavored sweetener were placed in each of a plurality of pens and the baby pigs in each pen were given a free choice of the thus sweetened and treated feeds over the same period of time. The pigs in each pen consumed more than twice as much of the feed treated with the flavored sweetener of this invention than of the sugar sweetened feed.

One advantage of this invention is to reduce the cost of producing "high sweet" feeds. The cost per pound of any one of the flavored saccharin formulas described above in relation to its replacement value of cane sugar will produce an average saving of $5.50 per 100 pounds of sugar replaced. This estimate is based on the lowest average cost of sugar, as compared to the present highest average cost of the flavored saccharin formulations. Thus, if a baby pig feed formula called for 300 pounds of sugar, and 200 pounds are replaced with 2 pounds of Formula No. 2, it would represent a saving of $11.00 per ton in the cost of manufacturing the feed, less the very small cost to replace the weight of 198 pounds of sugar with a suitable inert ingredient.

Another advantage is to reduce the cost of shipping and storage. For all practical purposes, by using Formula No. 3 as an example, these estimated costs would be as much as 1000 times less than the shipping and storage costs of sugar.

Still another advantage is to provide for the first time a scientific program for flavor-sweetening feeds. For instance, the formulations are designed so that each type of feed can be flavored and sweetened according to its need for acceptability to livestock. A higher degree of flavor-sweetness is required for starter feeds. Thus, as in the case of Formula No. 2, 2 pounds are recommended per ton of starter feeds, 1 pound per ton of grower feeds, and ½ pound per ton of finisher feeds. Some specialty feeds usually require more flavor-sweetener than ordinary feeds, so from 1 to 2 pounds are recommended per ton of mineral feeds, medicated feeds, high fat feeds, feed concentrates, and poultry and other livestock remedies. This spread between 1 and 2 pounds of flavor-sweetener varies according to the percentage of medication, fat, or other unpalatable ingredients used in the specialty feed. On the other hand, still using Formula No. 2 as an example, forage feed stuffs usually require only from ½ to 1 pound of flavor-sweetener per ton of forage depending upon the type and quality of the forage crop. However, this does not exclude the possibility of increasing or decreasing the strength of the flavored saccharin formulas, as would be necessary with Formulas 1, 3, 4, and 5 so that the recommended amounts of a given formula could be increased or decreased accordingly.

Another very important advantage is to intensify the flavor and sweetness of such natural nutritionally active feed additives as molasses, carob, and honey, and extend the use of such other carbohydrate feed ingredients having flavor values but which cannot be used in excessive quantities because of the ill effects they may have on the dietary system.

Yet another advantage is to add sweet taste appeal and lasting flavor freshness to livestock and poultry feeds by eliminating unpleasant rancidity odors and masking the unpleasant taste of medicinal and chemical additives. In other words, flavor to attract animals to the feed, and sweeteners to mask unpleasant tastes.

It is thought that the invention and its attendant advantages will be understood from the foregoing description, and it will be apparent that various changes may be made in the composition and ingredients thereof without departing from the spirit and scope of the invention or sacrificing all of its material advantages, the forms hereinbefore described being merely preferred embodiments thereof.

I claim:

1. A flavored live stock feed comprising live stock feed and a mixture combined therewith, said mixture comprising concentrated sweetener and live stock feed flavoring, in the proportions of from about 1 to about 99.95% by weight of concentrated sweetener and from about 0.05 to about 99% by weight of live stock feed flavoring.

2. A flavored live stock feed comprising live stock feed and a mixture combined therewith, said mixture comprising concentrated sweetener and live stock feed flavoring, in the proportions of from about 1 to about 99.95% by weight of concentrated sweetener and from about 0.05 to about 99% by weight of live stock feed flavoring, said mixture and live stock feed combined in proportions of from about ½ to about 2 pounds of said mixture per ton of live stock feed.

3. The flavored livestock feed as set forth in claim 1 wherein said mixture comprises from about 1.1% to about 22% by weight of concentrated sweetener and live-stock feed flavoring in from about 98.9% to about 78% by weight of a carrier.

4. The flavored livestock feed as set forth in claim 3 wherein said mixture is a dry powder made up of from about 1.1% to about 22% by weight of concentrated sweetener and livestock feed flavoring in from about 98.9% to about 78% by weight of a carrier.

5. The flavored livestock feed as set forth in claim 1 wherein the carrier comprises water and acacia, as an emulsifying agent.

6. The flavored livestock feed as set forth in claim 1 wherein said concentrated sweetener is saccharin sodium.

7. The flavored livestock feed as set forth in claim 5 wherein said livestock feed flavoring is anise.

8. The flavored livestock feed as set forth in claim 1 wherein said mixture comprises from about 0.1% to about 10% by weight of said mixture of anise, from about 1% to about 90% by weight of said mixture of sodium saccharin and from about 98.9% to about 0% by weight of said mixture of corn sugar as a carrier.

References Cited in the file of this patent

UNITED STATES PATENTS

| | | |
|---|---|---|
| 1,512,730 | Washington | Oct. 21, 1924 |
| 2,504,788 | Baker | Apr. 18, 1950 |
| 2,803,551 | Helgren | Aug. 20, 1957 |
| 2,876,106 | Jucaitis | Mar. 3, 1959 |

FOREIGN PATENTS

| | | |
|---|---|---|
| 443,090 | Great Britain | 1936 |